US012605903B2

(12) United States Patent
Coupe et al.

(10) Patent No.: US 12,605,903 B2
(45) Date of Patent: Apr. 21, 2026

(54) TRACER STRAND FOR WEAVING A COMPOSITE MATERIAL PART REINFORCEMENT

(71) Applicants: SAFRAN, Paris (FR); ALBANY, Rochester, NH (US)

(72) Inventors: Dominique Marie Christian Coupe, Moissy-Cramayel (FR); Yann Didier Simon Marchal, Moissy-Cramayel (FR); Brock Gilbertson, Rollinsford, NH (US)

(73) Assignees: SAFRAN, Paris (FR); ALBANY, Rochester, NH (US)

( * ) Notice: Subject to any disclaimer, the term of this patent is extended or adjusted under 35 U.S.C. 154(b) by 181 days.

(21) Appl. No.: 17/699,710

(22) Filed: Mar. 21, 2022

(65) Prior Publication Data

US 2022/0297391 A1 Sep. 22, 2022

Related U.S. Application Data

(60) Provisional application No. 63/163,340, filed on Mar. 19, 2021.

(51) Int. Cl.
| | |
|---|---|
| *B29C 70/24* | (2006.01) |
| *B29D 99/00* | (2010.01) |
| *D03D 15/267* | (2021.01) |
| *D03D 15/275* | (2021.01) |
| *D03D 25/00* | (2006.01) |

(52) U.S. Cl.
CPC .......... *B29C 70/24* (2013.01); *B29D 99/0025* (2013.01); *D03D 15/267* (2021.01); *D03D 15/275* (2021.01); *D03D 25/005* (2013.01); *D10B 2101/06* (2013.01); *D10B 2101/12* (2013.01)

(58) Field of Classification Search
None
See application file for complete search history.

(56) References Cited

U.S. PATENT DOCUMENTS

| | | | | |
|---|---|---|---|---|
| 6,601,378 | B1 * | 8/2003 | Fritsch | D02G 3/28 |
| | | | | 57/244 |
| 2007/0092379 | A1 | 4/2007 | Coupe et al. | |
| 2016/0010246 | A1 * | 1/2016 | Nakai | D02G 3/402 |
| | | | | 28/165 |
| 2016/0243777 | A1 * | 8/2016 | Marchal | B29D 99/0025 |

FOREIGN PATENT DOCUMENTS

| | | | |
|---|---|---|---|
| CN | 107476079 | * | 12/2017 |
| KR | 20120131449 | * | 12/2012 |
| RU | 2413590 | * | 3/2011 |

OTHER PUBLICATIONS

Machine Translation of CN107476079 (Year: 2017).*
Machine Translation of RU2413590 (Year: 2011).*
Machine Translation of KR20120131449 (Year: 2012).*

* cited by examiner

*Primary Examiner* — Shawn Mckinnon
(74) *Attorney, Agent, or Firm* — CUSHMAN PARTNERS, LLC

(57) ABSTRACT

A tracer strand for the weaving of a composite material part reinforcement, the tracer strand including one or more carbon yarns twisted with one or more yarns of a material having a color contrasting with the color of the carbon yarns, the yarns being twisted together according to a twist included between 10 turns per meter and 80 turns per meter.

10 Claims, 4 Drawing Sheets

[Fig. 1]
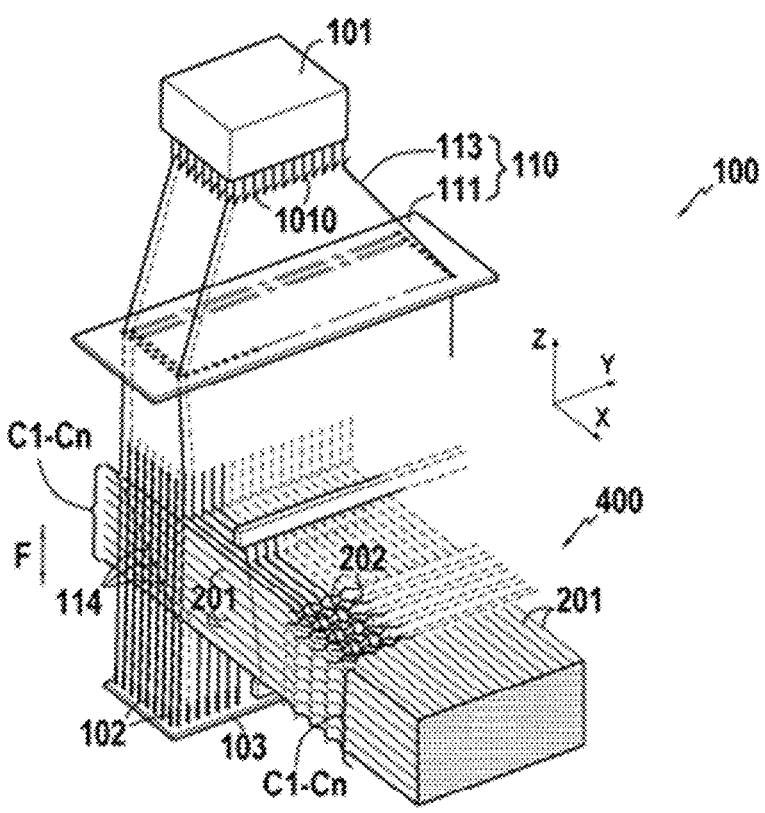
[Fig. 2]
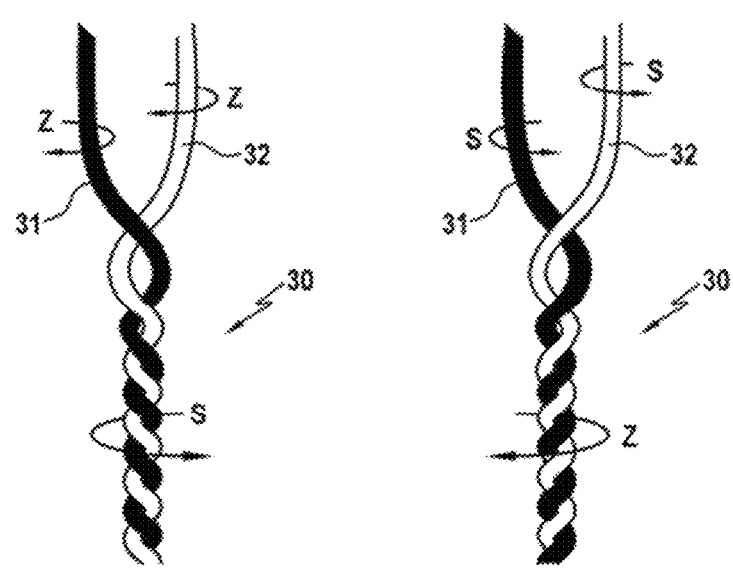

[Fig. 3]
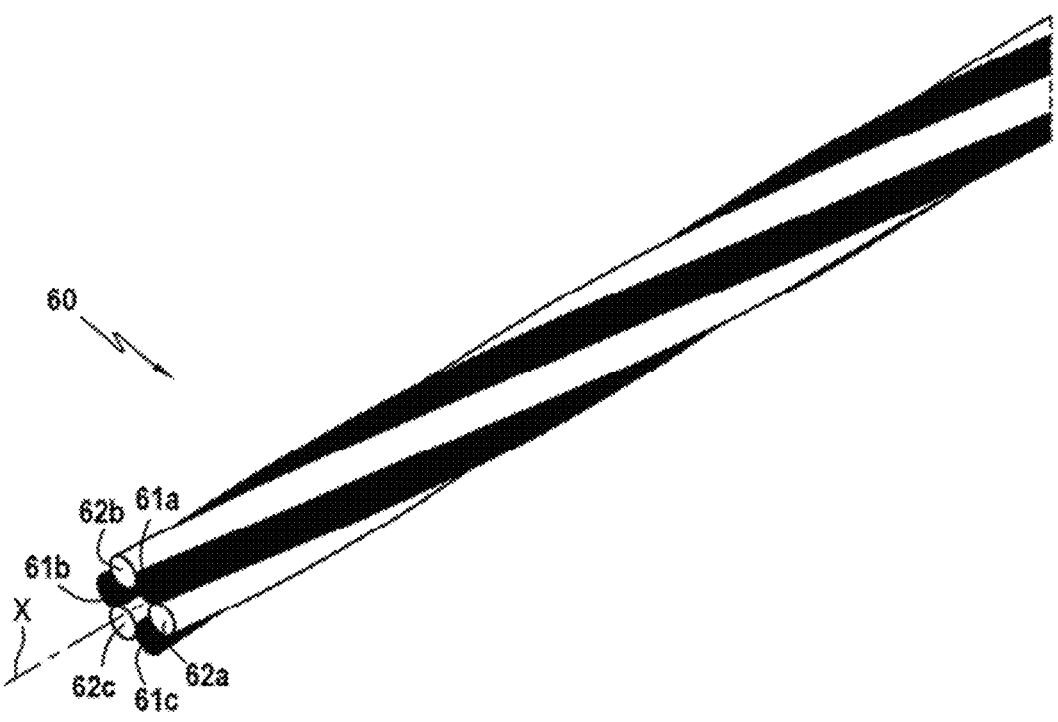
[Fig. 4]
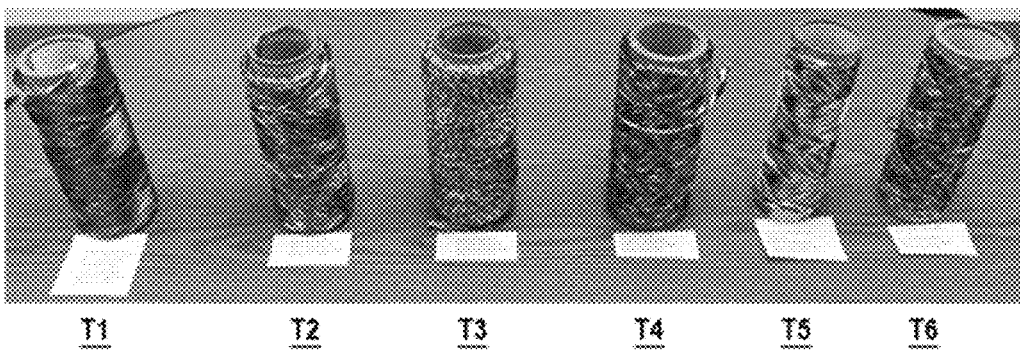

[Fig. 5]
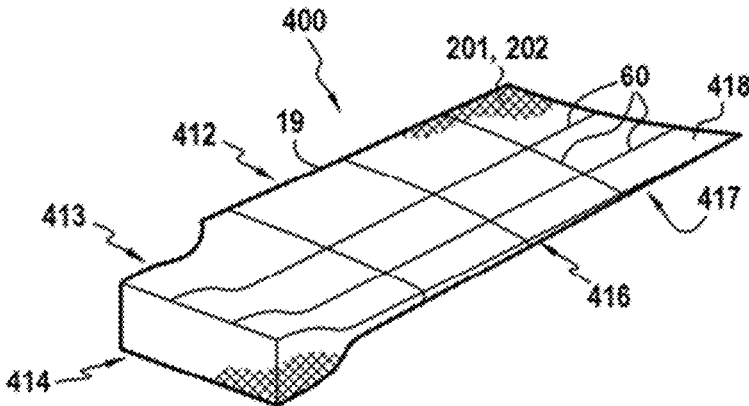
[Fig. 6]
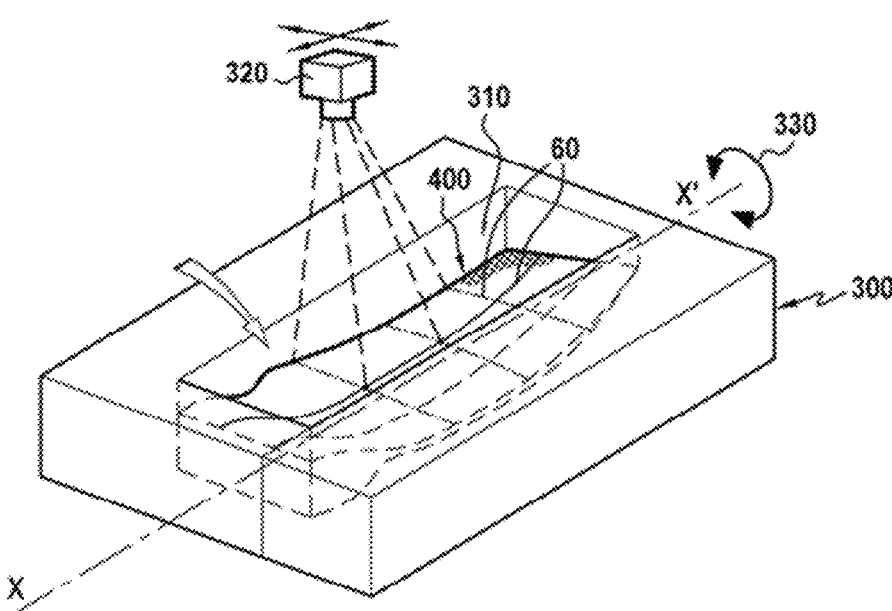

[Fig. 7]
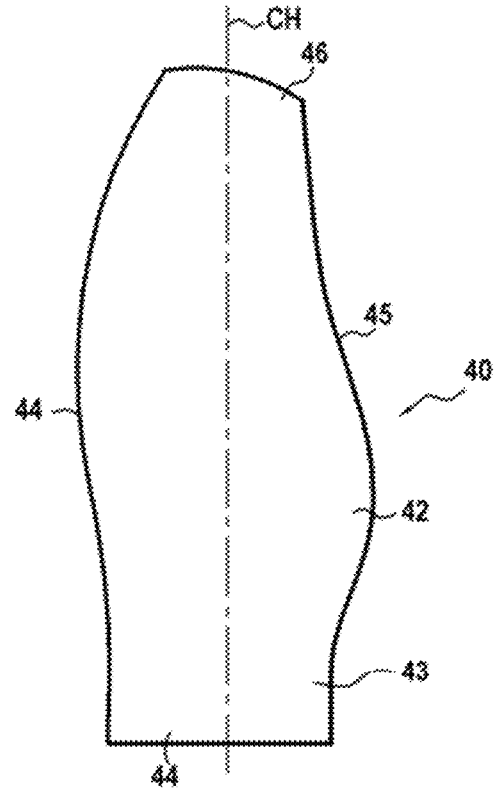
[Fig. 8]
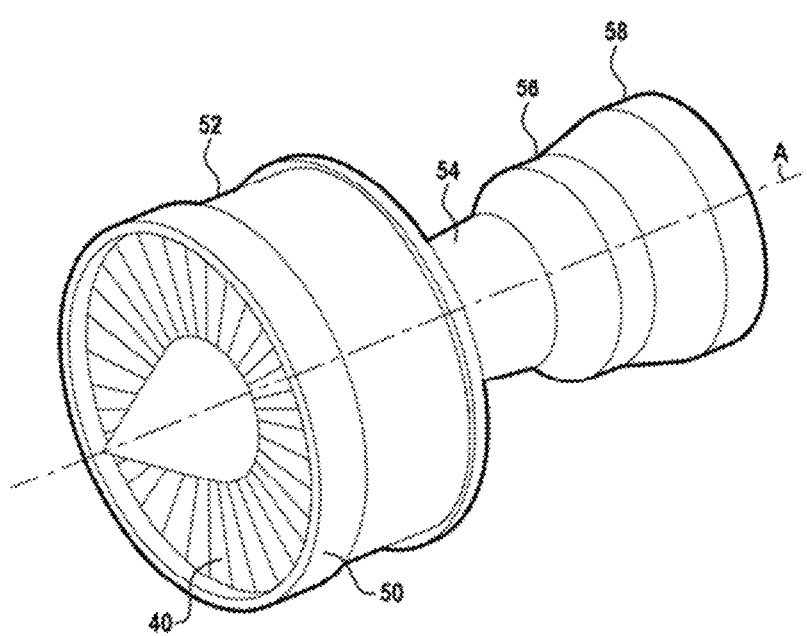

TRACER STRAND FOR WEAVING A COMPOSITE MATERIAL PART REINFORCEMENT

CROSS-REFERENCE TO RELATED APPLICATIONS

This application claims priority to U.S. Provisional Patent Application No. 63/163,340, filed Mar. 19, 2021, the entire content of which is incorporated herein by reference in its entirety.

FIELD

The invention relates to the manufacture of composite material parts of gas turbine for aeronautical engines and, more particularly, the weaving of fibrous textures intended to form the fibrous reinforcement of the composite material part.

BACKGROUND

Previously made of metallic material, gas turbine or turbomachine parts for aeronautical engines are now made of composite material, i.e. from a fibrous texture densified with an organic matrix. This allows producing parts having an overall mass that is smaller than the same parts when they are produced of metallic material, while still having mechanical strength that is at least equivalent, if not greater.

The fibrous texture intended to constitute the fibrous reinforcement of the composite material part is desirably produced by three-dimensional (3D) weaving, which allows conferring very good mechanical strength on the resulting composite material part.

The 3D weaving of fibrous structures intended to constitute the fibrous reinforcement of a composite material part, such as a blade of an aeronautical engine for example, is produced on a loom of the Jacquard type, the weaving consisting of inserting weft yarns between the warp yarns, creating a pattern.

Once woven, the fibrous texture is cut out and formed into the final geometry of the part to be produced. The control of the positioning of the fibrous texture during these operations is important for obtaining a final part complying with specifications. To this end, tracer yarns with a different color from the other yarns of the fibrous texture are present at predetermined locations, in particular at the surface of the texture, in order to serve as reference points for positioning. Document US 2007/0092379 discloses the production of a fibrous structure intended to form the fibrous reinforcement of a composite material fan blade. In this document, tracer strands of glass or of Kevlar® (registered trademarks of E.I. du Pont de Nemours and Company) are introduced into the fibrous texture during its weaving in the place of carbon yarns. The glass and Kevlar® strands being white in color compared to the carbon strands which are black in color, they are therefore quite visible by an operator on the surface of the texture.

However, the carbon strands in the 3D weave have a relatively large size, also called count, generally corresponding to a multiple of the count of 12K (12,000 filaments). Due to this large size, the replacement of one or more carbon strands with glass or Kevlar® strands significantly modifies locally the properties of the composite material initially defined with carbon yarns. This modification causes losses of important mechanical properties in the final part which are not desirable.

Consequently, there exists a need for the production of fibrous textures with one or more tracer strands, the impact of which on the mechanical properties of the final part is minimized.

SUMMARY

To this end, an aspect of the invention proposes a method for manufacturing a tracer strand for the weaving of a composite material part reinforcement, characterized in that the method comprises the twisting of one or more carbon yarns with one or more yarns of a material having a color contrasting with the color of the carbon yarns, the yarns being twisted together according to a twisting rate comprised between 10 turns per meter and 80 turns per meter.

The tracer strand according to the invention comprises both carbon and a material having a color contrasting with that of the carbon yarns, which allows minimizing the impact of the tracing strand on the expected mechanical properties for the final part compared to a strand consisting only of a material different from carbon. In addition, the inventors have noted that by twisting one or some yarns of material with a light color with one or some carbon fibers according to a twisting rate comprised between 10 turns per meter and 80 turns per meter, the yarns of material with a color contrasting with the color of the carbon fibers are quite present on the surface of the tracer strand, in particular when it consists of several carbon yarns and of at least one yarn of a material having a color contrasting with that of the carbon yarns.

What is meant here by "material having a color contrasting with the color of the carbon yarns" is a material able to have a contrast with the carbon during a visual inspection by an operator and/or during a non-destructive test such as by tomography for example.

The yarns twisted with the carbon yarns can be of a material selected in particular among one of the following materials: glass, Kevlar®, polyester and Bekinox®, these material having a white or light color easy to distinguish with regard to the carbon fibers, which are black in color.

According to a particular feature of the method of the invention, the tracer strand comprises a maximum of 50% by volume of yarn of a material having a color contrasting with the color of carbon. This limit allows further limiting the impact of the tracer strand on the expected mechanical properties for the final part.

According to another particular feature of the method of the invention, a tension is applied to the carbon yarn(s) during the twisting step. The inventors have noted that, during twisting, the application of a tension on the carbon yarn(s) favors the retention in the surface of the tracer strand of the yarn(s) of material of a color contrasting with the color of carbon and, consequently, the visibility of the tracer strand.

According to a particular feature of the method of the invention, the tracer strand is obtained by twisting three carbon yarns each having a count of 12K, with three glass yarns having a size or a count each having a cross section equivalent to the cross section of a carbon yarn with a count of 12K, the twisting being accomplished according to a twisting rate of 20 turns per meter. A tracer strand is thus obtained of which the glass yarns are particularly visible on the surface of the strand.

The invention also has as its object a tracer strand for weaving a composite material part reinforcement, the tracer strand comprising one or more carbon yarns twisted with one or more yarns of a material having a color contrasting with the color of the carbon fibers, the yarns being twisted together according to a twist comprised between 10 turns per meter and 80 turns per meter.

The yarns twisted with the carbon fibers can be of a material selected among in particular one of the following materials: glass, Kevlar®, polyester and Bekinox®, these materials having a white or light color easy to distinguish with regard to the carbon yarns which are black in color. According to a particular feature of the strand of the invention, the tracer strand comprises a maximum of 50% by volume of yarn of a material with a color contrasting with the color of carbon.

According to another particular feature of the strand of the invention, it comprises three carbon yarns each having a count of 12K, twisted with three glass yarns each having a cross section equivalent to the cross section of a carbon yarn with a count of 12K, the carbon and glass yarns having a twist of 20 turns per meter.

An aspect of the invention also has as its object a fibrous texture for producing a fibrous reinforcement of a composite material part, the fibrous texture having a three-dimensional or multilayer weave between a plurality of layers of warp strands and a plurality of layers of weft strands, the fibrous texture comprising at least one warp strand or one weft strand consisting of a tracer strand according to the invention.

Another aspect of the invention also relates to a gas turbine composite material part comprising a fibrous reinforcement consisting of a fibrous texture according to the invention and a matrix densifying the fibrous reinforcement. The part can in particular be a gas turbine fan blade.

BRIEF DESCRIPTION OF THE DRAWINGS

FIG. 1 is a schematic perspective view of a loom for producing a fibrous texture according to an aspect of the invention, FIG. 2 is a schematic view showing the twisting of a carbon yarn with a glass yarn in conformity with an embodiment of the invention, FIG. 3 is a schematic view showing the twisting of three carbon yarns with three glass yarns in conformity with another embodiment of the invention, FIG. 4 is a photo showing several examples of tracer strands conforming to embodiments of the invention, FIG. 5 is a schematic perspective view of a fibrous texture intended to form a fibrous blade reinforcement of composite material in conformity with an embodiment of the invention, FIG. 6 is a schematic perspective view showing the forming of the fibrous texture of FIG. 5, FIG. 7 is a schematic view showing a fan blade obtained from the preform of FIG. 6, FIG. 8 is a schematic perspective [view] comprising a plurality of fan blades of FIG. 7 in a gas turbine engine.

DETAILED DESCRIPTION

The invention applies generally to the production of fibrous textures by three-dimensional weaving which are able to constitute fibrous reinforcements, or preforms, for the manufacture of composite material parts, in particular blades of aeronautical engines, the parts being obtained by densification of the fibrous structures by a matrix. The matrix is typically a resin, in the case of composite materials used at relatively low temperatures, typically up to 300° C., or a refractory material such as carbon or a ceramic in the case of thermostructural composites.

What is meant here by "three-dimensional weaving" or "3D weaving" is a weaving mode by which at least certain of the warp yarns or strands connect the weft yarns or strands over several layers of weft, which allows having good mechanical strength of the fibrous structure and of the composite material part obtained, in a single textile operation.

FIG. 1 illustrates a loom 100 equipped with a Jacquard mechanism 101 supported by a superstructure not shown in FIG. 1. The loom 100 also comprises a harness 110 consisting of a comber board 111 and control yarns or stringers 113, each stringer 113 being connected at one end to a control hook 1010 of the Jacquard mechanism 101 and at the other end to one of the return springs 102 fastened to the frame 103 of the loom 100. Each stringer 113 comprises an eyelet 114 through which one warp yarn 201 passes. The stringers 113 and their associated eyelet 114 extend in a zone in which the stringers 113 and the eyelets 114 are driven with a substantially vertical oscillation movement shown by the double arrow F. The stringers 113 are subjected to traction forces respectively exerted by the control hooks 1010 and by the return springs 102. The stringers 113 allow lifting certain warp strands 201 according to a predefined weaving program. By lifting certain warp strands 201, the stringers 113 thus create a shed allowing the introduction of weft strands 202 for the 3D weaving of a fibrous structure 400. The warp strands 201 are organized into a plurality of warp layers $C_1$ to $C_n$. In the example described here, the fibrous texture 400 is intended to form the fibrous reinforcement of a composite material fan blade.

In conformity with an aspect of the invention, one or more warp strands and/or one or more weft strands consist of a tracer strand according to the invention.

FIG. 2 illustrates a tracer strand 30 consisting of a carbon yarn 31 and a yarn 32 of a material having a color contrasting with the color of the carbon yarns twisted together, the yarn 32 being of glass in the example described here. When the yarns 31 and 32 have each been spun in Z (clockwise direction), they are twisted together in S (counterclockwise direction). Conversely, when the yarns 31 and 32 have each been spun in S (counterclockwise direction), they are twisted together in Z (clockwise direction). The glass yarn 32 being white in color, it contrasts perfectly with the other strands used for the weave, namely strands exclusively composed of carbon yarns that are black in color. In addition, half of the tracer strand 30 including a carbon yarn, its impact on the mechanical properties of the final part is small in comparison with a strand consisting entirely of glass or of another material different from carbon.

The yarn(s) twisted with carbon yarns are of a material having a color contrasting with the color of the carbon yarns to as to be easily distinguishable by comparison with the carbon fibers which are black in color. What is meant here by "yarns of a material having a color contrasting with the color of the carbon fibers" is a material able to present a contrast with carbon during a visual inspection by an operator and/or during a non-destructive test such as for example by tomography (yarns visible in X-rays for example). The yarn(s) with a color contrasting with carbon can be of a material selected in particular among the following materials: glass, Kevlar®, polyester and Bekinox®. They can also be biosourced materials, such as basalt for example. The yarn(s) with a contrasting color are desirably, but not exclusively, produced of glass because it is a material that is very visible on the fibrous textures of carbon yarns and easily distinguishable by imaging. In addition, glass fiber is very widely available, and yarns made of glass fiber are easy to procure, and at low cost.

FIG. 3 illustrates another example of a tracer strand 60 according to the invention, which differs from the tracer strand 30 in that it consists of three carbon yarns 61*a*, 61*b* and 61*c* and of three glass yarns 62*a*, 62*b* and 62*c*, twisted together. The glass fibers 62*a*, 62*b* and 62*c* being white in color, they contrast perfectly with the other strands used for weaving, namely strands composed exclusively of carbon fibers which are black in color. In addition, half of the tracer strand 60 including a carbon yarn, its impact on the mechanical properties of the final part is small in comparison with a strand consisting entirely of glass or of another material different from carbon.

Still in conformity with the invention, the twisting rate of the yarn(s) of a material having a color contrasting with the color of the carbon yarns with the carbon yarn(s) in a tracer strand is comprised between 10 turns per meter and 80 turns per meter. The inventors have noted that, by twisting one or some yarns with a color contrasting with one or some carbon yarns according to a twisting rate comprised in this range, the yarn(s) of contrasting color are actually present on the surface of the tracer strand in particular when it consists of several carbon yarns and of at least one yarn of contrasting color.

The count of the yarn(s) used during the weaving of a fibrous texture according to the invention is determined depending on the count of the carbon warp and weft strands used for weaving the fibrous texture. The count of the tracer yarn(s) is desirably equivalent to the count of the carbon warp and weft strands in order not to perturb the weave pattern defined for the fibrous texture.

The count or titration of a strand corresponds to its size (depending on the type of material of the yarn, the density varies, hence the volume occupied by the same mass will be different) and can be defined by the number of filaments that compose it. In this case, the count of the yarn is expressed in "K," which corresponds to the number in thousands of filaments per yarn. For example, a 1K yarn comprises 1000 filaments.

By way of a non-limiting example, the tracer strand 30 described above can have a cross section corresponding the cross section of a carbon yarn or strand with a count of 24K, corresponding to the carbon yarns or strands used for the weaving of the fibrous texture. In this case, the carbon yarn 31 can have a count of 12K and the glass yarn a cross section equivalent to that of a carbon yarn also with a count of 12K in order to form by twisting between these two yarns a tracer strand having a cross section close to that of a carbon yarn or strand of 24K. The cross section of a yarn or strand is defined here by the number of filaments multiplied by the surface area of the cross section of a unit filament. By way of an example, glass generally has greater filament diameters than the diameters of carbon filaments.

Still by way of a non-limiting example, the tracer strand 60 described above can have a count equivalent to a count of 48K corresponding to the count of the carbon strands used for the weaving of the fibrous texture. In this case, the three carbon yarns 61*a*, 61*b* and 61*c* can each hold a count of 12K while the three glass yarns each have a cross section close to or equivalent to a carbon yarn with a count of 12K allowing obtaining, after twisting with carbon yarns, a tracer strand having an overall cross section substantially equivalent to the cross section of a carbon yarn of 48K. By way of an example, a tracer strand corresponding to the tracer strand 60 can be produced by twisting together three carbon yarns with a count of 12K marketed under the denomination "Hexcel® HexTow® IM7" with three glass yarns marketed under the denomination "HYBON®2022" or "HYBON® 2026" having a TEX of 413.

According to a particular aspect of the invention, each tracer yarn desirably comprises a maximum of 50% by volume of yarn of a material having a color contrasting with the color of the carbon yarns, so as to minimize the impact of this material on the mechanical properties of the final part which are defined for carbon strands.

According to another aspect of the invention, a tension can be applied to the yarn(s) during their twisting with one or some yarns of contrasting material. The inventors have noted that, during twisting, the application of a tension only on the carbon yarn(s) (i.e. no tension being applied to the contrasting material yarn(s)) or the application of a tension on the carbon yarn(s) greater than the tension applied to the contracting material yarn(s) during twisting favors the retention on the surface of the tracer strand of the contrasting material yarn(s) and consequently, the visibility of the tracer strand.

FIG. 4 shows six examples of tracer strands T1 to T6 conforming to the invention, each packaged on a spool. The conditions of producing each of the tracer strands are the following:

T1: the tracer strand is produced from 3 carbon yarns marketed under the denomination "Hexcel® HexTow® IM7," each having a count of 12K and from 2 glass yarns marketed under the denomination "HYBON® 2022" or "HYBON® 2026" having a TEX of 413 equivalent in cross section to a carbon yarn with a count of 12K, the 3 carbon yarns and the 2 glass yarns being twisted together according to a twisting rate of 20 turns per meter;

T2: the tracer strand is produced from 3 carbon yarns marketed under the denomination "Hexcel® HexTow® IM7," each having a count of 12K and from 3 glass yarns marketed under the denomination "HYBON® 2022" or "HYBON® 2026" having a TEX of 413 equivalent in cross section to a carbon yarn with a count of 12K, the 3 carbon yarns and the 3 glass yarns being twisted together according to a twisting rate of 40 turns per meter;

T3: the tracer strand is produced from 3 carbon yarns marketed under the denomination "Hexcel® HexTow® IM7," each having a count of 12K and from 3 glass yarns marketed under the denomination "HYBON® 2022" or "HYBON® 2026" having a TEX of 413 equivalent in cross section to a carbon yarn with a count of 12K, the 3 carbon yarns and the 3 glass yarns being twisted together according to a twisting rate of 80 turns per meter;

T4: the tracer strand is produced from one carbon yarn with a count of 36K previously produced from 3 carbon yarns marketed under the denomination of "Hexcel® HexTow® IM7," each having a count of 12K, and from 3 glass yarns marketed under the denomination of "HYBON®2022" or "HYBON®2026" having a TEX of 413, equivalent in cross section to a carbon yarn with a count of 12K, the 36K carbon yarn and the three glass yarns being twisted together according to a twisting rate of 40 turns per meter;

T5: the tracer strand is produced from 3 carbon yarns marketed under the denomination "Hexcel® HexTow® IM7," each having a count of 12K and from 3 glass yarns marketed under the denomination "HYBON® 2022" or "HYBON® 2026" having a TEX of 413 equivalent in cross section to a carbon yarn with a count of 12K, the 3 carbon yarns and the 3 glass yarns being twisted together according to a twisting rate of 20 turns per meter. A tension is also applied only to the carbon fibers during twisting;

T6: the tracer strand is produced from 1 carbon yarn with a count of 36K previously produced from 3 carbon yarns marketed under the denomination of "Hexcel® HexTow® IM7," each having a count of 12K, and from 3 glass yarns marketed under the denomination "HYBON® 2022" or "HYBON® 2026" having a TEX of 413 equivalent in cross section to a carbon yarn with a count of 12K, the 36K carbon yarn and the 3 glass yarns being twisted together according to a twisting rate of 40 turns per meter. A tension is also applied only to the carbon yarns during twisting.

As illustrated in FIG. 4, the glass yarn(s) appear on the surface of the tracer strands, this in a more or less marked manner depending on the conditions of production. Among the tracer strands T1 to T6, the tracer strand T5 seems to be that in which the glass yarns are most visible at the surface.

The manufacture of a composite material blade based on the woven fibrous texture 400 in FIG. 1 is now explained. FIG. 5 illustrates the fibrous texture 400 which, as previously described, is woven in a single piece. In FIG. 5, the fibrous texture 400 has been trimmed by cutting the contour according to a predetermined three-dimensional template designed so that after deformation, the preform matches the geometry of the finished part. The fibrous texture 400 comprises parts 414, 413 and 412 intended to form respectively the root, the support and the airfoil of the final blade. The warp strands 201 and the weft strands 202 used for the three-dimensional weave are mainly (black) carbon strands. Tracer strands 60 as previously described are also integrated into the weave at predetermined positions located essentially on the surface of the preform. In the example described here, tracer strands 60 are present along the principal longitudinal direction parallel to the warp yarns 201 and along the transverse direction parallel to the weft yarns 202. In this manner, the tracer strands 60 appear as a white part over the rest of the preform which is black, and are therefore very visible. In addition to being visually detectable, these tracer strands are detectably by conventional non-destructive testing technologies (tomographic type using X-rays or by ultrasound), allowing verifying the conformity of the final part.

Here in particular, the tracer strands 60 are present on the surface of the two faces 417 and 418 of the fibrous texture 400 (respectively intended to form the pressure side wall and the suction side wall of the blade) at predetermined locations in order to serve as reference points for the positioning for the purpose of cutting out and of other processing steps of the preform as will be disclosed below.

During this cutting out step, it is provided to retain a series of tracer strands 60 located at the surface of the texture along at least one reference edge 416, which in the case illustrated is the face intended to form the leading edge.

A pre-deformation of the cut-out fibrous texture 400 is then carried out. More precisely, this pre-deformation is carried out by placing the fibrous texture 400 in a forming mold 300 (FIG. 6) having different parts delimiting between them a cavity or recess 310 intended to accommodate the texture 400 and having marks serving as a reference for the positioning of at least certain of the tracer strands 60.

Different systems for tracking and positioning the fibrous texture, in particular a laser projector 320 (see FIG. 6) which projects a light beam on the ideal location of a tracer strand

60 so that it is then easy to place the texture accordingly relative to the corresponding tracer strand 60 to obtain the predetermined positioning.

Alternatively or additionally, masks, matching the contour and/or the position of all or a part of the tracer strands 60, can be placed on the preform so as to verify its proper positioning.

When the fibrous texture 400 is positioned in the forming mold 300, the texture is place in a configuration that deforms it, applying a rotation (arrow 320 in FIG. 6) around an axis XX' parallel to its principal direction, which has the consequence of spiraling the portion of the blade around this axis.

It will be appreciated that numerous different possibilities are practicable for forming the fibrous texture due to the use of the tracer strands of the invention as reference elements for positioning the fibrous texture in the forming mold.

The next step is the densification by a matrix of the fibrous preform thus produced. The densification of the fibrous preform consists of filling in the porosity of the preform, in all or part of its volume, with the material constituting the matrix. The matrix can be obtained in a fashion known per se according to the wet process method. The wet process method consists of impregnating the preform with a liquid composition containing an organic precursor of the material of the matrix. The organic precursor usually appears in the form of a polymer, such as a resin, possibly diluted in a solvent. The fibrous preform is placed in a mold in which the liquid precursor, a resin for example, is injected into the entire recess to impregnate the preform.

The transformation of the precursor into an organic matrix, namely its polymerization, is accomplished by heat treatment, generally by heating the mold, after the elimination of the possible solvent and the cross-linking of the polymer, the preform still being held in the mold having a shape corresponding to that of the part to be produced. The organic matrix can in particular be obtained from epoxy resins, such as for example the high performance epoxy resin sold [text missing?], or liquid precursors of carbon or ceramic matrices.

In the case of the formation of a carbon or ceramic matrix, the heat treatment consists of pyrolyzing the organic precursor to transform the organic matrix into a carbon or ceramic matrix depending on the precursor used and the pyrolysis conditions. By way of an example, liquid precursors of carbon can be resins with a relatively high coke rate, such as phenolic resins, while liquid ceramic precursors, particularly of SiC, can be resins of the polycarbosilane (PCS) or polytitanocarbosilane (PTCS) or polysilazane (PSZ) type. Several consecutive cycles, from impregnation to heat treatment, can be carried out to reach the desired degree of densification.

The densification of the fibrous preform can be accomplished by the well-known method of transfer molding called RTM ("Resin Transfer Molding"). In conformity with the RTM method, the fibrous preform is placed in a mold having the shape of the casing to be produced. A thermosetting resin is injected into the internal space delimited between the rigid material part and the mold and which comprises the fibrous preform. A pressure gradient is generally established in this internal space between the location where the resin is injected and the exhaust openings of the latter in order to check and optimize the impregnation of the preform by the resin.

The resin that is used can for example be an epoxy resin. Resins suitable for RTM methods are well known. They desirably have a low viscosity to facilitate their injection into the fibers. The selection of the temperature class and/or the chemical nature of the resin is determined depending on the thermomechanical loads to which the part will be subjected. Once the resin is injected into the entire reinforcement, its polymerization occurs by heat treatment in conformity with the RTM method.

After injection and polymerization, the part is removed from the mold. The part is finally trimmed to remove the excess resin and the chamfers are machined to obtain a fan blade 40 as illustrated in FIG. 7. The blade 40 comprises an airfoil 42 which extends between a root portion 44 and a tip portion 46. The blade 40 has a leading edge 44 and a trailing edge 45.

FIG. 8 illustrates an aeronautical gas turbine engine comprising, from upstream to downstream in the gas flow direction, a fan 50 positioned at the inlet of the engine, a compressor 52, a combustion chamber 54, a high-pressure turbine 56 and a low-pressure turbine 58. The fan 50 comprises a plurality of fan blades 40.

The invention can be applied to the manufacture of other gas turbine composite material parts such as for example fan blades, fan casings with retention zones, shims, fixed guide vanes (OGV) and propellers.

The expression "comprised between . . . and . . . " must be understood to include the limits.

The invention claimed is:

1. A method for manufacturing a tracer strand for the weaving of a composite material part reinforcement, the method comprising twisting one or more carbon yarns with one or more yarns of a material having a color contrasting with the color of the carbon yarns, the yarns being twisted together according to a twisting rate comprised between 10 turns per meter and 40 turns per meter, wherein, during the twisting, a tension is applied to the one or more carbon yarns that is greater than a tension applied to the one or more yarns of a material having a color contrasting with the color of the carbon yarns, wherein the tracer strand is obtained by twisting three carbon yarns each having a count of 12K, with three glass yarns each having a cross section equivalent to the cross section of a carbon yarn with a count of 12K, the twisting being accomplished according to a twisting rate of 20 turns per meter.

2. The method according to claim 1, wherein the tracer strand comprises a maximum of 50% by volume of yarns of a material having a color contrasting with the color of the carbon yarns.

3. A tracer strand for weaving a composite material part reinforcement, the tracer strand comprising one or more carbon yarns twisted with one or more yarns of a material having a color contrasting with the color of the carbon fibers, the yarns being twisted together according to a twist comprised between 10 turns per meter and 40 turns per meter wherein, during the twisting, a tension is applied to the one or more carbon yarns that is greater than a tension applied to the one or more yarns of a material having a color contrasting with the color of the carbon yarns, wherein the tracer strand is obtained by twisting three carbon yarns each having a count of 12K, with three glass yarns each having a cross section equivalent to the cross section of a carbon yarn with a count of 12K, the twisting being accomplished according to a twisting rate of 20 turns per meter.

4. The tracer strand according to claim 3, wherein the tracer strand comprises a maximum of 50% by volume of yarns of a material having a color contrasting with the color of the carbon yarns.

5. A fibrous texture for producing a fibrous reinforcement of a composite material part, the fibrous texture having a three-dimensional or multilayer weave between a plurality of layers of warp strands and a plurality of weft strands, the fibrous texture comprising at least one warp strand or one weft strand consisting of a tracer strand according to claim 3.

6. A fibrous texture for producing a fibrous reinforcement of a composite material part, the fibrous texture having a three-dimensional or multilayer weave between a plurality of layers of warp strands and a plurality of weft strands, the fibrous texture comprising at least one warp strand or one weft strand consisting of a tracer strand according to claim 4.

7. A fibrous texture for producing a fibrous reinforcement of a composite material part, the fibrous texture having a three-dimensional or multilayer weave between a plurality of layers of warp strands and a plurality of weft strands, the fibrous texture comprising at least one warp strand or one weft strand consisting of a tracer strand according to claim 3.

8. A gas turbine composite material part comprising a fibrous reinforcement consisting of a fibrous texture according to claim 5 and a matrix densifying the fibrous reinforcement.

9. The part according to claim 8, wherein said part is a gas turbine fan blade.

10. The method according to claim 1, wherein, during the twisting, a tension is applied to the one or more carbon yarns and no tension is applied to the one or more yarns of a material having a color contrasting with the color of the carbon yarns.

* * * * *